US010044555B2

United States Patent
Bhaskaran et al.

(10) Patent No.: US 10,044,555 B2
(45) Date of Patent: Aug. 7, 2018

(54) RELIABLE ISP ACCESS CLOUD STATE DETECTION METHOD AND APPARATUS

(71) Applicant: Aspen Networks, Inc., Santa Clara, CA (US)

(72) Inventors: Sajit Bhaskaran, Sunnyvale, CA (US); Anmol Kumar, Santa Clara, CA (US); Prashanth Krishnamurthy, Santa Clara, CA (US)

(73) Assignee: ASPEN NETWORKS, INC., Santa Clara, CA (US)

( * ) Notice: Subject to any disclaimer, the term of this patent is extended or adjusted under 35 U.S.C. 154(b) by 34 days.

(21) Appl. No.: 14/931,661

(22) Filed: Nov. 3, 2015

(65) Prior Publication Data

US 2016/0056998 A1 Feb. 25, 2016

Related U.S. Application Data

(63) Continuation of application No. 14/062,778, filed on Oct. 24, 2013, now Pat. No. 9,191,300, which is a continuation of application No. 12/910,690, filed on Oct. 22, 2010, now Pat. No. 8,675,485.

(51) Int. Cl.
| | |
|---|---|
| *H04L 12/26* | (2006.01) |
| *H04L 12/66* | (2006.01) |
| *H04J 3/16* | (2006.01) |
| *H04L 12/24* | (2006.01) |

(52) U.S. Cl.
CPC ...... *H04L 41/0668* (2013.01); *H04L 43/0811* (2013.01); *H04L 43/0864* (2013.01); *H04L 43/12* (2013.01); *H04L 43/50* (2013.01)

(58) Field of Classification Search
CPC ... H04L 43/0864; H04L 47/283; H04L 47/10; H04L 43/0829
See application file for complete search history.

(56) References Cited

U.S. PATENT DOCUMENTS

| | | | |
|---|---|---|---|
| 5,926,463 A | 7/1999 | Ahearn et al. | |
| 6,199,422 B1 * | 3/2001 | Boerhout | G05B 9/03 73/1.82 |
| 6,442,141 B1 * | 8/2002 | Borella | H04L 12/2602 370/248 |
| 6,754,622 B1 | 6/2004 | Beser et al. | |
| 7,124,181 B1 | 10/2006 | Magdych et al. | |

(Continued)

*Primary Examiner* — Melanie Jagannathan
(74) *Attorney, Agent, or Firm* — Polsinelli LLP

(57) ABSTRACT

A Multi-Homing System is equipped with an Adaptive JSP Access Cloud State Detection apparatus (ACSD) that improves the reliability of the availability of digital connections (links) between computer sites, such as a Computer Premises Network and the Internet, in which such connections are made by connecting through a multiplicity of ISP Access Clouds (links). Reliability is improved over prior art methods by using data elements of Internet Protocol datagrams, e.g. record fields or bits of fields, that are regularly and normally exchanged between the ISP Access Clouds and the CPN without creating additional data traffic. Data Elements from each ISP Access Cloud are used by processing functions of the by the ACSD to test for conditions that indicate that it may be in a DOWN status. when a DOWN status is suspected, other functions in the ACSD initiate transmission of a set of PROBE packets that can reliably determine if the suspect link is actually DOWN or merely giving a response that would be interpreted as DOWN by prior art methods.

20 Claims, 13 Drawing Sheets

(56) References Cited

U.S. PATENT DOCUMENTS

| | | | |
|---|---|---|---|
| 7,385,924 B1* | 6/2008 | Riddle | H04L 12/2602 370/235 |
| 7,636,321 B1* | 12/2009 | Iannaccone | H04L 43/0864 370/252 |
| 8,675,485 B2* | 3/2014 | Bhaskaran | H04L 43/0811 370/231 |
| 2004/0083299 A1* | 4/2004 | Dietz | G06F 17/30985 709/230 |
| 2004/0111529 A1 | 6/2004 | Parmar | |
| 2004/0225729 A1* | 11/2004 | Sabiers | H04L 12/2602 709/224 |
| 2005/0018612 A1 | 1/2005 | Fitzgerald | |
| 2005/0122910 A1 | 6/2005 | Parupudi et al. | |
| 2006/0072479 A1* | 4/2006 | Loyd | H04L 43/0864 370/254 |
| 2006/0083238 A1 | 4/2006 | Lee et al. | |
| 2006/0159025 A1* | 7/2006 | Abdo | H04L 12/2602 370/249 |
| 2006/0165002 A1 | 7/2006 | Hicks et al. | |
| 2007/0058562 A1* | 3/2007 | Scobbie | H04L 43/0852 370/252 |
| 2008/0144624 A1* | 6/2008 | Marcondes | H04L 43/026 370/392 |
| 2008/0316914 A1 | 12/2008 | Vercellone et al. | |
| 2011/0106956 A1* | 5/2011 | Luo | H04L 29/06 709/228 |
| 2014/0301215 A1* | 10/2014 | Somoskoi | H04L 43/0852 370/252 |
| 2016/0105353 A1* | 4/2016 | Cociglio | H04L 43/0829 370/252 |

* cited by examiner

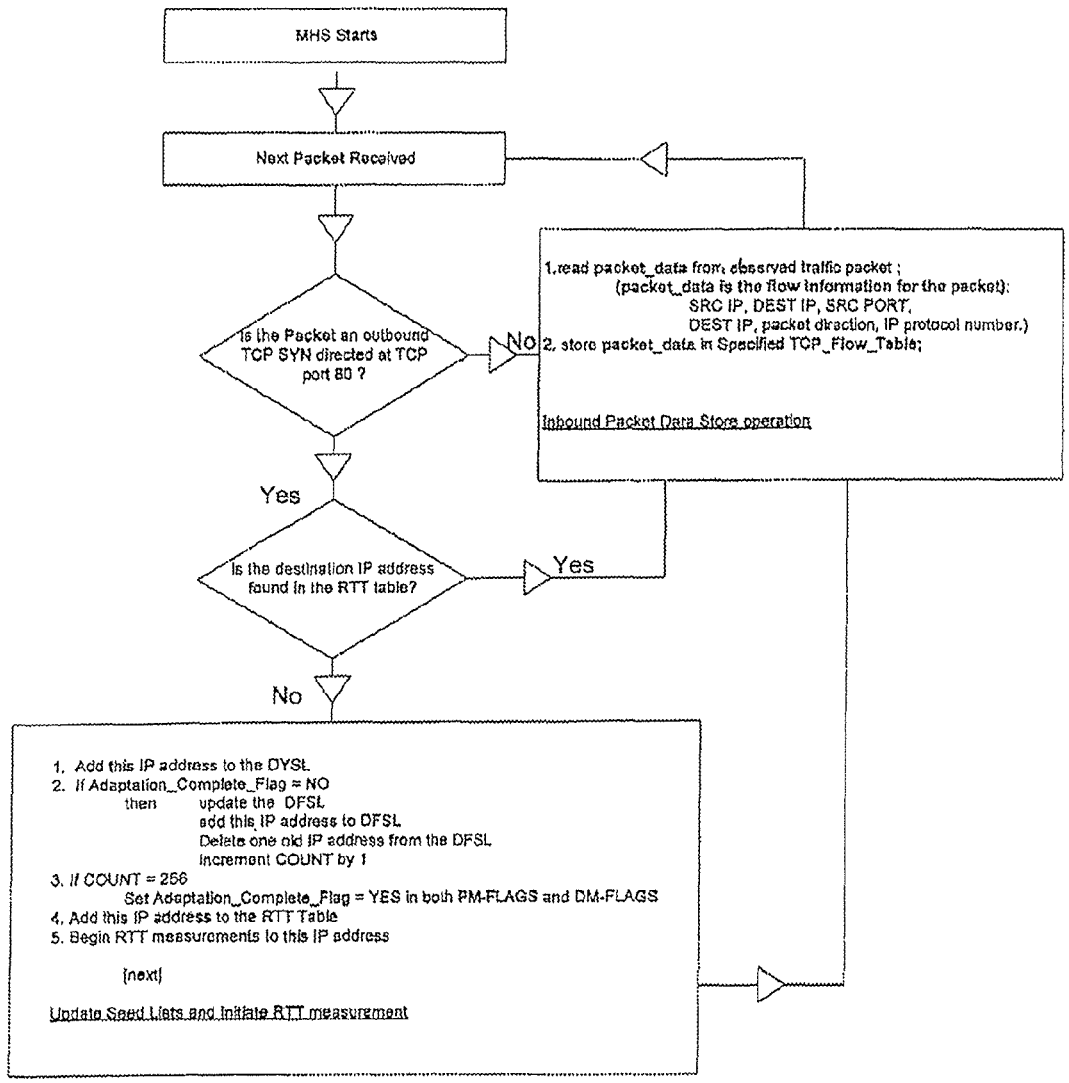
Fig 5B — Auto detection of new Web Destination IP addresses and Seed List Update Random TCP Source Port Selection Update Inbound Packet Byte Count

```
0      207.171.163.90
1      64.236.16.20
2
3
4
5

255    198.133.219.25
```

**Fig 6
Default Seed List**

Default/Dynamic Seed List Adaptation

| 4 bit version | 4 bit IP header length | 8 Bits DS Byte | 16 bits total IP datagaram length in bytes | |
|---|---|---|---|---|
| 16 bits Identification field | | | 3 bit flags | 13 bit fragmentation offset |
| 8 bit time to live | | 8 bit protocol | 16 bit header checksum | |
| 32 bit Source IP Address | | | | |
| 32 bit Destination IP Address | | | | |
| IP options if any | | | | |

IP Header format

Fig. 8A

| 16 bit source TCP port | | | | | | | | 16 bits destination TCP port | |
|---|---|---|---|---|---|---|---|---|---|
| 32 bit sequence number | | | | | | | | | |
| 32 bit acknowlegement number | | | | | | | | | |
| 4 bit header length | 6 bits reserved | URG | ACK | PSH | RST | SYN | FIN | 16 bit Window Size | |
| 16 bit TCP checksum | | | | | | | | 16 bit URG pointer | |
| TCP options if any | | | | | | | | | |

TCP Header format

Fig. 8B

RELIABLE ISP ACCESS CLOUD STATE DETECTION METHOD AND APPARATUS

CROSS-REFERENCE TO RELATED APPLICATIONS

The present application is a continuation of U.S. patent application Ser. No. 14/062,778 entitled "Reliable ISP Access Cloud State Detection Method and Apparatus," filed Oct. 24, 2013, now allowed, which is a continuation of U.S. patent application Ser. No. 12/910,690 entitled "Reliable ISP Access Cloud State Detection Method and Apparatus," filed on Oct. 22, 2010, now issued as U.S. Pat. No. 8,675, 485, issued on Mar. 18, 2014, the disclosure of which is hereby incorporated by reference in its entirety for all purposes.

BACKGROUND

Field of the Invention

Connections to the Internet.

FIG. 1 illustrates a typical Customer Premises Network (CPN) 1-100, communicating with the Internet 1-101. The CPN connects to the Internet in the typical manner, through a set of Internet Service Providers, i.e., the ISP Access Clouds ISP-1, ISP-2, - - - ISP-n. The term Access Cloud (often referred to as an Internet link) is used here to distinguish from other, more general terms that have been used to denote Internet connections, but those more general terms also may introduce different, unwanted connotations.

The elements of the entire Internet-ISP Access Cloud connections-CPN system include: The Internet represented as the upper cloud icon INTERNET, the ISP-1 Access Clouds [ISP-1-2-3-4], and the Customer Premises Network that includes a prior art Multihoming System (MHS) connecting the ISP access clouds to Customer User Equipment (CPE). The CPE usually has a Customer owned Hub, Switch or Router connected to a multiplicity of Customer USER servers, computers, work stations and the like, represented here by USER-1, 2, . . . USER m. The Customer Premises Equipment (CPE) resides in the CPN, as does some ISP-owned equipment, indicated by the overlap between the ISP Access Clouds and the CPN.

Each ISP-n Access Cloud has a communication path or connection for Internet traffic (indicated by double-headed arrow ISP-n) that is identified as such by the MHS. As shown in FIG. 2 below, the ISP-n connection from the MHS to the Access cloud is usually a single router (router-n) owned by the particular ISP but located in the customer-premises, a "last mile" link e.g. T1, DSL connecting router-n to a phone company central office or ISP-n point of presence, an Internet router at the ISP-n point of presence (Aggregation-router-n), and all the neighboring routers belonging to ISP-n up to the point where ISP-n connects to another ISP. Each ISP-n, router-n combination is represented by the 'ISP Access cloud' icon named, e.g., ISP-1. As shown in FIG. 1, each ISP Access cloud, ISP-n, forms a uniquely identified communication path between the MHS and the Internet.

The communication path ISP-1 through the first ISP Access Cloud consists of the first link or connection to the MHS (the overlap of the Access Cloud and the Customer Premises) and a second link or connection to the Internet (the overlap of the Access Cloud and the Internet cloud).

On the other side of the MHS there are connections to the CPE in the CPN. In the example shown in FIG. 1, customer premises equipment (USER-I, USER-2, . . . USER-M) accesses Internet traffic (double-headed arrows) by separate connections to the MHS through a router, hub or switch. Each of the connections to the MHS from USER equipment may also include a separate firewall (not shown).

Each of the MHS-access cloud connections may also have Ethernet switches, routers or hubs interposed between.

The Access Clouds are shown partly shared by the Internet and partly shared with the CPN indicating that equipment identifying each ISP is distributed, with some Customer Premises equipment (e.g., usually a router) located in the customer premises 1-104. In the CPN of FIG. 1 Multi-homing system (MHS) 1-106 is the entity within the CPN directly communicating with the ISP Access Clouds on the one side and CPN User equipment USER-1, USER-2, . . . USER-M (servers, PCs, workstations, etc.) communicating directly with the MHS.

FIG. 1 represents what is typically found in a CPN ranging from a moderate size to enterprise-wide Customer Premises Network incorporating a Multihoming System (MHS) connected to the Internet through a parallel multi-plicity of ISP Access Clouds (links).

Definition of an ISP Access Cloud

Referring to now to FIG. 2, a more detailed diagram of a typical ISP Access Cloud 1b-100 is shown. An Access Cloud is that collection of elements, which are jointly responsible for delivering Internet traffic to and from the Customer Premises Network 1-100. The first four elements of that collection are a series or chain including, in this example, Customer Owned Ethernet switch 1b-102, ISP-owned customer premises router 1b-104, a Telco facility 1b-106 providing a wide area line (DSL, T1, T3, Wireless, etc), and an ISP point of presence router 1b-108. Note that in most cases, some Customer Premises Equipment (CPE) 1b-102, although physically located at a Customer site, will belong to the ISP Access Cloud 1b-100. After the router 1b-108, communication to the rest of the Internet proceeds by parallel paths, e.g., ISP backbone routers 1b-110, 112. If any one element of the series chain in an ISP Access Cloud fails, Internet traffic will not be successfully routed through the ISP Access Cloud to the Customer Premises Network. Hence the entire ISP Access Cloud forms a single reliability chain.

FIG. 2 does not cover all cases exhaustively, as ISP Access Clouds are extremely diverse; however it is typical. What is common in all cases is that many routers 1b-108, 110, 112, Ethernet switches 1b-102, and sometimes phone company switching equipment 1b-106, are involved in the reliability chain, some on customer premises, some on Incumbent Local Exchange Carrier (ILEC) premises, with the majority of routers 1b-108, 110, 112 being on ISP premises.

In terms of reliability An ISP Access Cloud can be only in one of two states: UP or DOWN.

In the UP state, when all, the elements in the reliability chain are functioning, Internet traffic is successfully delivered to multiple destinations in each direction.

When at least one element in the reliability chain fails, the ISP Access Cloud will be in the DOWN state.

Note that unlike traditional networks prior to the Internet, the reliability chain spans multiple domains of responsibility. In FIG. 2, there are 3 domains: a) the customer (who owns and controls the CPE router and CPE Ethernet switch), b) the Incumbent Local Exchange Carrier who delivers T1 or DSL lines wholesale to an ISP (Telco facility 1b-112, and c) the ISPs themselves (including the ISPs hub, switch or router, e.g., router 1b-104).

Typically, the MHS maintains a list of User-IP Address (UIA-1, UIA-2 . . . UIA-m), which is a sub-set of the Internet's Destination IP address list. For the particular CPN 1-100, the Internet 'cloud' includes a Designated List of active ISPs (servers) denoted as ISP [N]. The members of that set may be enumerated as ISP-n, for n ranging from 1 to N.

Elements of Typical ISP Access Cloud

FIG. 2 shows elements of a typical ISP Access Cloud, these elements include: more routers to Internet; ISP back bone router[s]; ISP Point of Presence router; Telco facility: Wide area line (example DSL, T1, T3, Wireless link. On the Customer Premises, a Router; Ethernet Switch; Customer Premises Network; MHS, router & Users.

Prior Art Internet Connection Reliability Measures

Periodic ICMP Requests to Fixed IP List Configured by User

Some existing prior art in ISP Access Cloud status detection involve includes sending periodic ICMP (Internet Control Message Protocol) Echo requests to the fixed list of IP addresses, which is maintained and stored by the CPN, generally in the MHS unit memory storage system. This is a common process well known in the art.

Description of the Related Art

Drawbacks of Prior Art Reliability Measures

When these requests are sent through a specific ISP, and fail to elicit an ICMP Echo response, that ISP is declared down. A major drawback of the ICMP request approach in previous systems is that it is unreliable in common situations.

One common situation arises because of router blocking of ICMP packets. Many ISPs configure their routers to block (i.e. drop) ICMP request packets, especially during times when the Internet as a whole or a single ISP is experiencing problems.

When this happens the ICMP requests will time out and the Users MHS will falsely conclude that the ISP is DOWN, even though it is really UP.

A second drawback of previous systems is that the user has to configure a list of destination ISP addresses that need to be checked. The User usually configures this fixed List as part of their normal setup and/or operation procedures. This is an extra burden on system operations personnel.

A third drawback of such previous systems is that once the list of ISP destination addresses is generated, the list is fixed. Over some sustained time period, some or all of the machines supporting the addresses on the fixed list can be taken out of service and be replaced by a machine with a different address providing the same communication path. In that case a false DOWN indication would be detected by an MHS relying on the ICMP packet.

A fourth drawback in the previous systems is non-randomness of flows with systems relying on cache storage of flows. The ICMP requests involve fixed values in the IP address fields that do not change over time. Because of this the following class of fault conditions will not be detected by such a system. Under hostile conditions on the Internet, sometimes these caches storing flows fill up, and new flows are no longer admitted into the router. Old flows will continue to appear to function though, including the ICMP request and response packets. The multi homing system in this case will report a false UP status, i.e. It will fail to detect a true ISP-Access Cloud DOWN status.

It is highly desirable to have a reliable method of detecting the communication status of a network connection as UP or DOWN in the presence of the conditions described above.

A system of reliably verifying UP/DOWN status of a particular ISP is greatly desired and would provide more robust Internet communications for users and suppliers.

SUMMARY

One object of the present invention is to provide a method and apparatus to reliably detect ISP Access Cloud states as either "UP" or "DOWN".

A second object of the invention is to provide an auto-learning and adaptive approach for generating a User list of ISP addresses to check for reliable connections thereby removing that burden from User network system operations, freeing the customer of the time and effort to create and maintain a meaningful list.

It is an advantage to the User of the present invention that it provides a method and apparatus that completely solves this problem.

Another object of the invention is to provide a multi homing system that automatically learns and caches the most recently used destination IP addresses. This keeps the list of addresses 'fresh', i.e., those most currently active and thus less likely to be taken out of service, automatically removing old addresses that are more likely to become 'stale', and subject to false DOWN status indications as in prior art systems.

Another object of the invention is to randomize selection of flows in such a way that even if an ISP Access Cloud device's internal tables become full, such that it prevents new user sessions from accessing the Internet, then auto-detection and auto-recovery from that condition is possible.

BRIEF DESCRIPTION OF THE DRAWINGS

FIG. 5B depicts an AUTO DET & SEED LIST UPDATE program module for the Computing Resource CR-1 shown in FIG. 4.

FIG. 6 is a DFSL diagram used to verify ISP-ACSD UP or Down status in the ACSD of FIG. 4.

FIG. 8A depicts the standard JP Header Format commonly used in the art.

FIG. 8B depicts the standard TCP Header Format commonly used in the art.

DETAILED DESCRIPTION

A Top Level View of an Embodiment of the Invention

Figure 1:
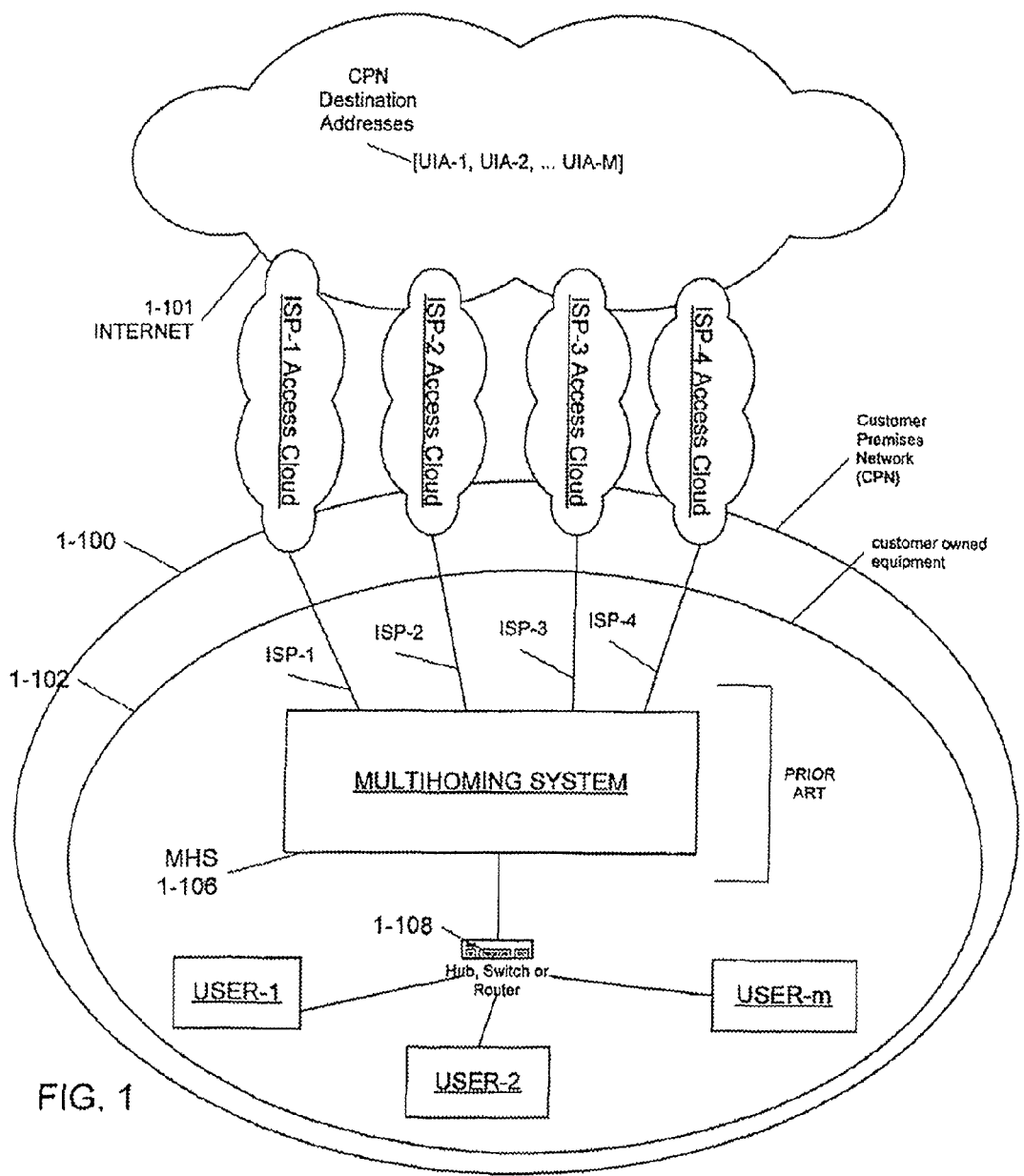
FIG. 1 is a diagram of a typical Customer Premises Network incorporating a Prior Art Multihoming System (MHS) connected to the Internet through a multiplicity of ISP Access Clouds (links).
Figure 3:
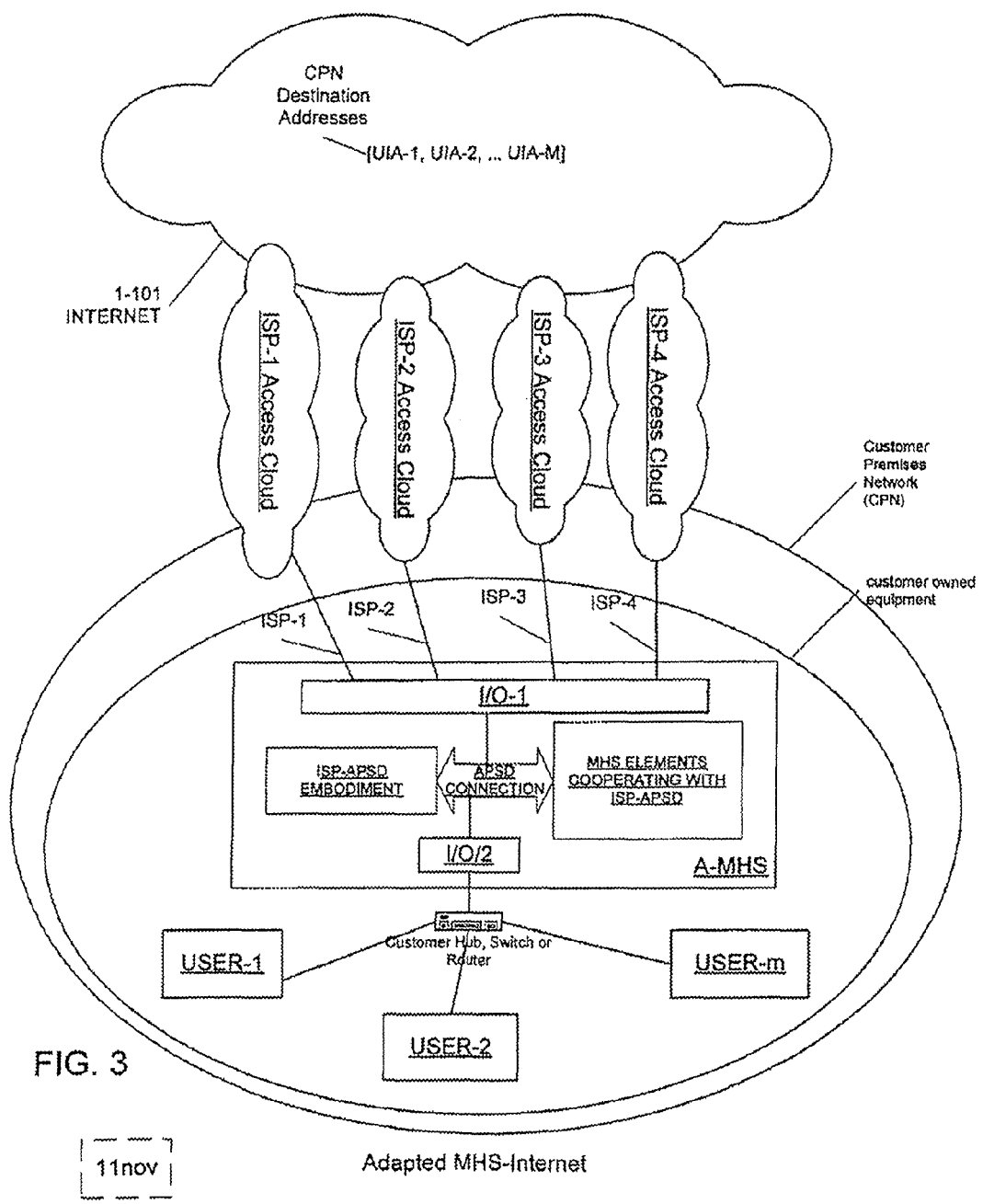
FIG. 3 shows the Customer Premises Network of FIG. 1 connected to the Internet through an Adaptive Multihoming System having an embedded ISP-ACSD in accordance with an aspect of the present invention.

Referring now to FIG. 3 there is shown a top-level block diagram of an embodiment of an Adaptive MHS (A-MHS) 2-104 according to the present invention located in a CPN as is the prior art MHS in the diagram of FIG. 1.

The AA-MHS is adapted to incorporate an embodiment of an Access Cloud Status Detector according to the present invention, the embodiment shown as ISP-ACSD.

The CPN system is typically connected to a multiplicity of separate ISP Access Clouds. Each ISP has an identifier (a name or a number that is unique within the MHS system. This is also well known in the art).

The adapted MHS has first connection means CM-1 communicating with Users computer equipment 1b-104 (User-1, User-2) at the User site and second connection means (ISP-1, 2, . . . of FIG. 1) represented here by arrow CM_2 communicating to the Internet 1-102 of FIG. 1.

First connection means CM-1 generally includes one or more User hubs, switches or routers connecting multiple Internet access request sources, e.g., User-1, User-2 . . . (User computers, servers and the like) to the A-MHSA-MHS.

2nd connection means CM-2 consists of a multiplicity of ISP Access Clouds. The ISP Access Clouds previously have often been referred to as access links, or sometimes as access ports. Such connections are generally configured as servers, e.g., ISP-1, -2, -3, -4 with respective routers (router-1, -2, -3, -4).

The ISP-ACSD 2-100 and internal elements 2-104 of the MHS communicate data and control commands through an internal ACSD connection represented by arrow 2-106.

Figure 2:
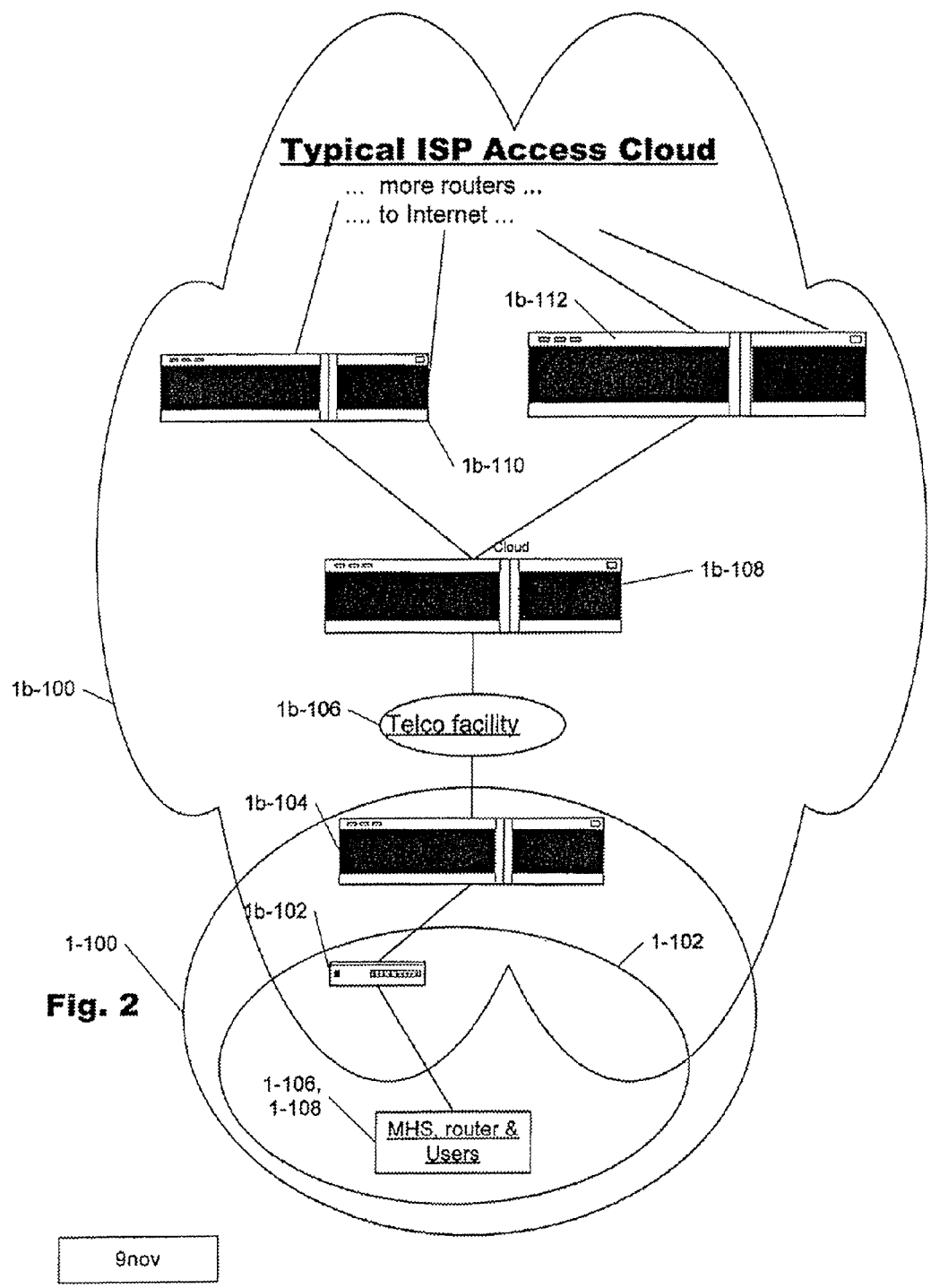
FIG. 2 illustrates a Typical ISP Access Cloud shown in FIG. 1

In FIG. 3 there is shown a more detailed block diagram 300 of the ISP-ACSD 2-100 of FIG. 2.

The ISP-ACSD includes Non-volatile storage memory PM-1 (Permanent Memory Storage space allocated to Default Seed List data DFSL), dynamic memory storage DM-1, a computing resource CR-1 with a control program CP-1, a data bus DB-1 and read/write/control bus R/W&C-1 connecting between the computing resource CR-1 and the memories. DB-1 and R/W&C-s also connect to the internal MHS functions as shown on FIG. 2. I/O interfaces I/O-1 and I/O-2 shown in FIG. 3 connect the MHS internal functions 2-104 to the Internet and User equipment through CM-1 and CM-2 of FIG. 2.

Although preferred embodiments of the present invention are described as including a computing processor module, the invention is understood to apply to multihoming solutions that include either single or multi-processor computing modules. FIG. 3 shows the same kind of structure as the Prior Art of FIG. 1, except that FIG. 3 illustrates an adapted MHS (A-MHSA-MHS) including an embodiment of the ISP-ACSD invention that replaces the prior art MHS of FIG. 1.

elements in FIG. 3 having the same indentifying reference characters are the same as in FIG. 1, and include:
INTERNET, ISP-n Access Clouds, C.PN, customer owned equipment, such as i.e., USER-1, - - - USER-m, I/O-1, I/O-2, and the Customer Hub, Switch or Router.

Elements in FIG. 3 different than in FIG. 1 are:
the ISP-ACSD, and the ACSD CONNECTION to the MHS elements cooperating with ISP-ACSD (E-MHS).

Figure 4:
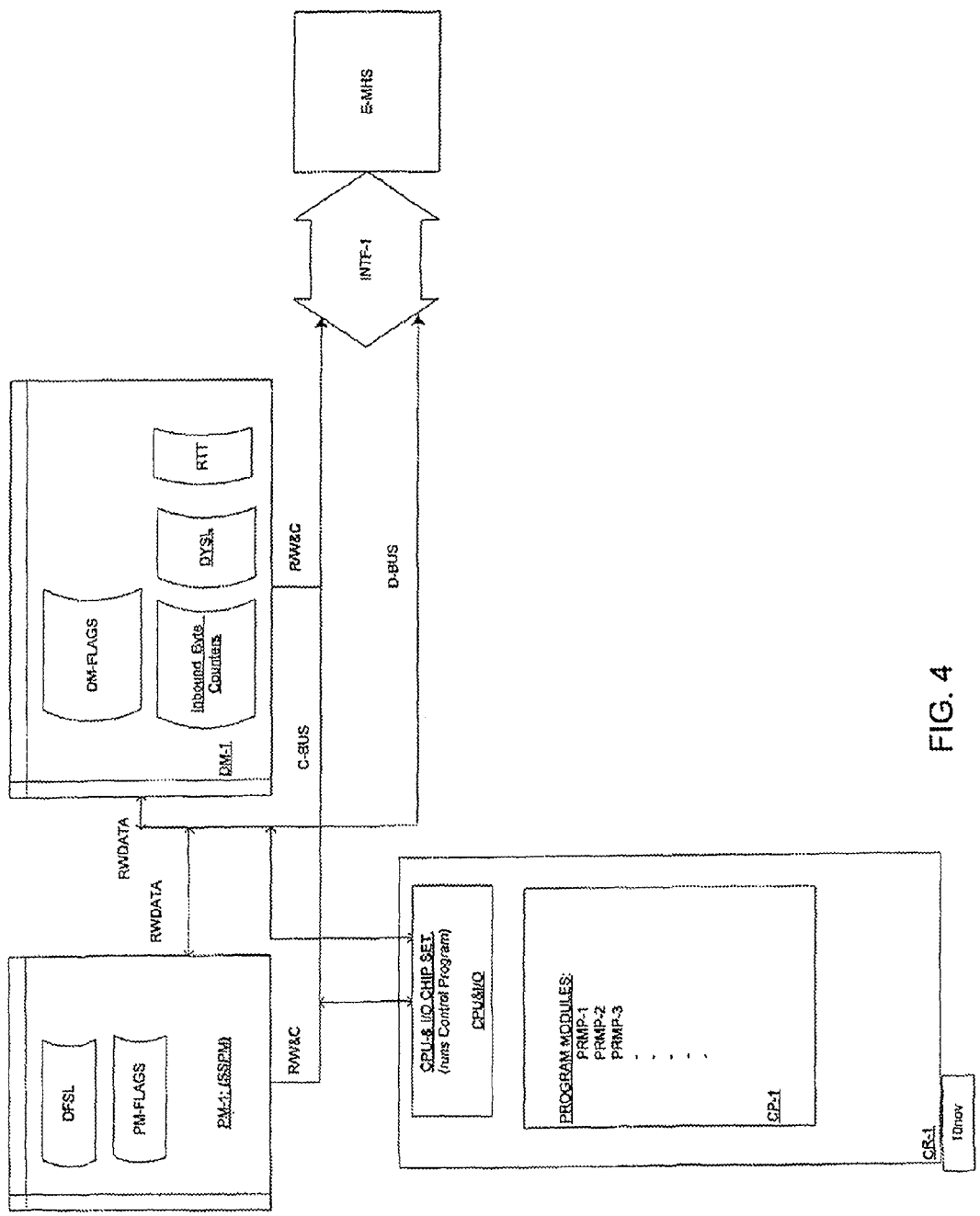
FIG. 4 is a detailed block diagram of the ISP-ACSD shown in FIG. 3.

Detail Block Diagram of ACSD; FIG. 4

FIG. 4 illustrates a block diagram of Adaptive MHS of FIG. 3 and FIG. 4, adapted to incorporate an embodiment of the present invention, and specifically a preferred embodiment shown in FIG. 2 as ISP-ACSD embedded in the MHS.i.]

The ISD-ACSD Embodiment of FIG. 4 includes:
PM1: Non-Volitile-Memory-1 is Permanent Memory Storage with space allocated to DFSL data and the Adaption_Complete_Flag used in the PowerOnSequence module (described below)

Dynamic Memory-1 is dynamic memory with dynamic storage space (SSDM) allocated to Dynamic Seed List data, and to Round Trip Time History data (the RTT table), Inbound_Byte_Counters for storing Inbound Packet Byte count for ISP access clouds 1-N, and storage space DM-FLAGS for various flags used as described below Other elements of the ACSD include: COMPUTING RESOURCE CR-1, typically a CPU & I/O chip set connected to a DATA BUS (D-BUS) and a CONTROL BUS (C-BUS) that communicate with memories DM-1 and PM-1.

The D-BUS and C-BUS also connect through INTERFACE (INTF-1) to selected MHS elements (E-MHS) that are generally inherent in the MHS. The pertinent connections and MHS elements (E-MHS) are those that provide data values, flags, register contents, drivers and the like that the ACSD and the adaptive MHS utilize in performing their functions in embodiments of the present invention.

Knowledgeable computer networking hardware and software design practitioners are familiar with the needed MHS elements (E-MHS) and how to structure the INTF-1 in order to design, build and operate a particular implementation of the present invention. The MHS elements (E-MHS) and the INTF-1 required for a particular embodiment of the present invention will become clear from the detailed description of the ACSD invention's structure, operation and its relationship to the A-MHS which follows.

The ACSD Computin Resource CR-1 operates the ISP-ACSD control Program CP-1. The CP-1 includes a number of Program Modules & Procedures (PRMP-1, 2, 3 . . . ) described below that enables the ACSD to provide the features and benefits of the present invention with the A MHS.

The ACSD has a Read/Write memory configuration including a permanent or non-volatile part, PM-1, and a high-speed dynamic part, DM-1.

The permanent (or durably persistent) read-write digital memory store, i.e., Non-Volitile-Memory-1 (PM-1) is allocated to store Default Seed List (DFSL) data, and permanent memory Flags (PM-Flags) data indefinitely with power off.

Dynamic Memory-1 DM-1 is allocated to store Dynamic Seed List data and a Round-Trip-Time-History table (RTT) for storing Round-Trip-Time-History data (described below).

The ACSD has an internal Control Bus and an internal Read/Write Data bus. The Control_Bus transmits Control_Commands to, and from, all units connected to it. The Control_Commands transmitted and received by units connected on the control_bus includes Read/Write Control and Request commands for reading and writing data on the Data_Bus.

Knowledgeable practitioners of the computer arts can configure particular implementations of PRMP modules to run on one or another of a number of well-known operating systems, for example Unix™, Linux™ or Microsoft Windows™ by understanding the detailed description of the present invention that follows.

The D-BUS communicates Read and Write data (RW-DATA) to and from the units connected to it, i.e., the memories PM-1 & DM-1, the Computing Resource CR-1, and through the Interface INTF-1, to the MHS elements.

In a similar manner, the C-BUS communicates Read & Write and Control Commands (R/W&C) to the units connected to it, i.e., the memories PM-1 & DM-1, the Computing Resource CR-1, and through the Interface INTF-1, to the MHS elements.

The communication links I/O-1, I/O-2 to the MHS 1-104 are connected so that ALL traffic from the customer premises users User-1, 2, . . . User-n must pass through it before being transmitted by the MHS 1-104 to the Internet 1-102. As a consequence, ALL inbound and outbound web traffic 2-108 will pass through the MHS.

ACSD control and data communication with the MHS

The ACSD communicates with the MHS elements 2-104 through the interface INTF-1 so that the MHS1-104 will detect web browser traffic originating from that customer site that is destined for Web servers these specific customers normally access. This is observed by the system 1-104 as IP traffic 2-108 destined to the well-known TCP port 80.

The ACSD CONTROL_PROGRAM uses A New Address Detection module, described below, to capture the source TCP port, the source IP address and the destination IP address of all outbound IP traffic requests (i.e., flows where the destination TCP port is 80) and the time of the destination address request and stores them in an internal Destination Traffic state table. See table 1, below.

Stale Address Aging Algorithm

An Aging_Algorithm (not shown), for aging Destination Traffic state table entries (see Table below) periodically examines the entries in the Destination Traffic state table and deletes those that become stale, i.e., when the Address_Request_Time value indicates their age exceeds some Address_Age_Time_Limit, beyond which entries are considered stale. When entries become stale, the Aging_Algorithm deletes them.

It is well known that in the case of Web traffic, packet flows tend to be extremely short lived, so the aging and deletion of stale flows is important. Otherwise more memory storage space must be allocated to store otherwise stale entries. To persons schooled in the art of building systems like an MHS, or a firewall, or a router, there are numerous techniques, algorithms and methods that are widely known and available for the creation and organization of such state tables and for creating such Aging_Algorithms. Any of a number of such techniques, algorithms and methods will do. The Table 1 below depicts an example of part of one such table for the ACSD.

TABLE 1

Internal State Table example: outbound dest ip

| Src Port | Dest Port. | SRC IP | Dest IP | Address_Request_Time |
|---|---|---|---|---|
| 12344 | 80 | 64.3.4.5 | 128.186.5.2 | T1 |
| 13425 | 80 | 65.6.7.2 | 193.2.3.4 | T2 |
| 10347 | 80 | 64.3.4.5 | 66.125.23.129 | T3 |

Default Seed List of IP Destinations: General Description.

The Adapted MHS system 1-104 would generally come to a User's site from a manufacturer or supplier by having Default Seed List data installed in the ISP-ACSD unit. Referring to FIG. 6 and again to FIG. 2, the Default Seed List 600 (DFSL) is a list of IP addresses 602, each of which are known active servers on the Internet that a web browser can expect to connect to. A preferred method of supplying an initial Default Seed List is to store the Default Seed List data in a storage space allocated on permanent [non-volatile] volatile media, e.g. PM 1. Other forms of persistent, but alterable, memory e.g. a hard disk, EEPROM, Flash Memory and the like may also be used.

The computing resource CR-1 is typically a PC board (or boards) containing a CPU, memory & chip set that runs a control program CP-1 the program CP-1 includes a set of control program modules, listed in table 1 and described below.

Program Modules in ISP-ACSD:

Control Program Modules

Figure 5A:
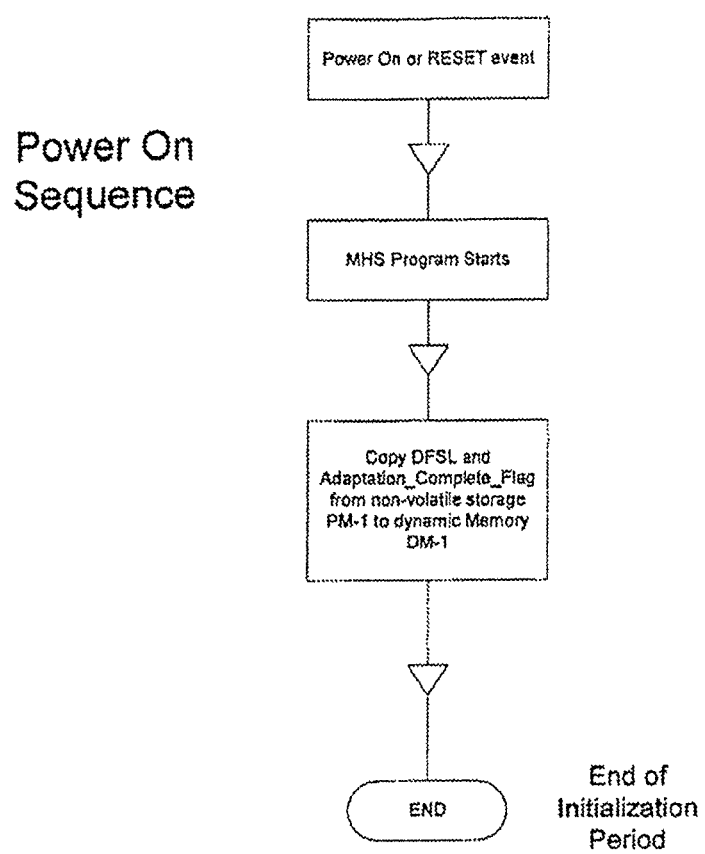
FIG. 5A is an exemplary flow chart for a Power_On_Sequence program module used to verify ISP-ACSD UP or Down status in the ACSD of FIG. 4.

A representative Power_On_Sequence Program Module 500 for the CP-1 shown in FIG. 4 is shown in FIG. 5A

Power-On update of seed lists: Refresh Of Adaptive Dynamic Seed List (Access Cloud IP Destinations) At every power on or reset event 502, a copy of the default seed list in permanent storage (DFSL) is made in dynamic memory (DYSL) 506. A simplified sequence for the Power_On_Sequence Program Module 502 is shown below:

502: Power-On or Reset event;

504: MHS Program Starts;

506: Copy DFSL from Non-Volitile-Memory-1 to Dynamic Seed List in Dynamic Memory-1; Copy Adaptation_Complete_Flag from Non-Volitile-Memory-1 Location PM-Flags to Dynamic Memory-1 location DM-Flags.

508: end of Initialization (or Reset).

DFSL to DYSL Transfer

Every time the A-MHS system of FIG. 3 is powered on, the Power-Up Sequencer module in the ACSD retrieves the latest copy of the DFSL from the Permanent (non-volatile) Memory and stores a copy as the Dynamic Seed List into dynamic memory DM-1.

Continuous Update of DYSL

As the customer's web traffic is observed, the dynamic memory list is constantly updated with recently observed traffic, so that the seed List of IP addresses may eventually disappear, leaving only the 256 most recently accessed IP addresses in dynamic memory. This update is done by an Auto Detect & Seed List Update module 502, one of the modules PRMP in the CP-1 of FIG. 4.

Auto Det & Seed List Update

Auto Det & Seed List Update Program Module FIG. 5B.

FIG. 5B is a pseudo-code flow-chart for the Auto Det & Seed List Update program module 520, one of the modules PRMP shown in FIG. 4, it can also referred to as Web Traffic Detection (Or New Address Detection)) And Seed List Update.

502: MHS starts;
520: next packet received;
524: test if the received packet is an outbound tcp syn directed at tcp port 80; if YES, branch to step 528; if NO branch to step 526;
526 (inbound packet data store operation):
  read packet data from received packet;
  store packet data in specified TCP Flow Table;
  branch to step 522;
528 (test for RTT table):
  is the destination IP address found in the RTT table?;
   if YES branch to step 526;
   if NO branch to step 529;

-continued

```
529 (update See Lists& flag, initiate RTT measurement)
    add this IP address to the DYSL;
    if Adaptation_Complete_Flag = NO, then;
        update the DFSL;
        add this address to DFSL;
        delete one old IP address from the DFSL;
        increment count by 1;
    if COUNT = 256, then: set Adaption_Complete_Flag = YES in
    both PM-FLAGS and DM-FLAGS;
    add this IP address to the RTT table;
    branch to 526;
    END of module;
```

Figure 5C:
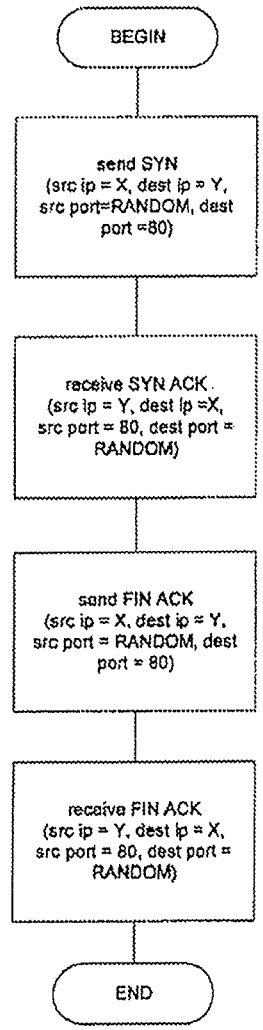
FIG. 5C shows a flow chart of a PROBE Sequence program module used to verify ISP ACSD UP or Down status in the ACSD of FIG. 4.

Referring to FIG. 5C, there is shown a diagram of the test packet sequence PROBE SEQ.

Referring also to FIG. 8A and FIG. 8B there is shown the well-known IP and TCP Header format and are provided here for convenient reference in describing operations, record fields and their values.

The fields definitions for the IP & TCP headers are well known, but are repeated here for convenience:

The following abbreviations are used for the different fields of the TCP and IP header:

TABLE 2

TCP/ICP abbreviations

| ACK field | 32 bit acknowledgement number:. |
|---|---|
| src ip | 16 bit TCP source address: |
| dest ip | 16 bit destination IP address: |
| src port | 16 bit TCP source port:: |
| dest port | 16 bit TCP destination port: |
| SYN, ACK, FIN | SYN, ACK, FIN are single bit fields defined in TCP Header |

The probe sequence PROBE is a sequence of packets 530 shown in FIG. 5C that does the following steps:
532: Send SYN;
534: wait until SYN ACK is Received;
536: Send FIN ACK;
538: wait until FIN ACK Received;

The values in the Header fields: dest ip, src port, and dest port are assigned according to the following list:

TABLE 3

Header field values 1. send SYN(src ip = X, dest ip = Y, src port = RANDOM, dest port = 80)
2. receive SYN ACK (src ip = Y, dest ip = X, src port = 80, dest port = RANDOM)
3. send FIN ACK(src ip = X, dest ip = Y, src port = RANDOM, dest port = 80)
4. receive FIN ACK (src ip = Y, dest ip = X, src port = 80, dest port = RANDOM)

values of X and Y are received by the MHS from the requesting USER equipment in the usual manner well known in the art.

The value for RANDOM is generated by the RND SEL program module described elsewhere.

A SYN is sent by setting the single bit SYN field to 1.

a SYN ACK is sent by setting both single bits SYN and ACK fields to 1, a FIN is sent by setting the FIN bit to 1, and a FIN ACK is sent by setting both FIN and ACK bits to 1. In sending out the initial SYN probe the 32-bit Sequence number in the TCP packet header is picked as a random 32-bit number by the RND SEL program module.

In sending any ACK packet, the ACK field is computed by adding 1 to the received 32-bit sequence number in the packet being acknowledged.

The probe packet sequence PROBE is sent both during the Normal_sampling operation and when the Access Cloud State Detector suspects an ISP-ACESS CLOUD is DOWN, but the mode of sending is modified by the HINT_DOWN_DET module described elsewhere.

for RTT measurement the PROBE packet sequence is sent as an IP datagram by the ACSD. This improves the reliability of the probe because 6 packets are sent instead of only 2 as in Prior Art ICMP packets means for transmitting an IP datagram is well known in the art.

The PROBE Sequence Set 530 exchanges 6 data packets. Prior Art ICMP protocol exchanges only REQ & ACK packets."

These PROBE sequence set are sent via all possible ISP paths for each new destination IP address, at the time the user sent a web browser request to a new destination (address); in other words, the sample taking of round trip time measurements via all possible ISP paths is done in an event-driven manner, each and every time the User Equipment sends a new web connection request; that is only if it is a new destination not found in the Web traffic RTT table.

It should be clearly understood that the destination IP address are not the same as the ISP addresses for the "ISP paths" (i.e., the ISP Access Clouds) in this description.

All" in this instance means those ISP paths known to the User Site's Equipment, to clarify this a little further, as noted above the description of the MHS the ISPs are all listed to the system, either enumerated by distinct numbers as 1, 2, 3 etc or by a finite set of unique names. In the case of the latter, the names are translated to unique internal numbers 1, 2, 3., as is well known in the art.

As described elsewhere above, the individual "each destination IP address" are stored in and retrieved from the DYSL by one or another of numerous well-known means that need not be enumerated here.

To understand "ISP Path", refer to FIG. 1, which depicts an MHS connected to 4 different ISPs via Router-1, Router 2, Router 3, Router-4. By sending the probe sequence to Router-1, for example, the path via ISP 1 is selected. For each destination Web address, A probe sequence is sent via Router-1's destination MAC address, and therefore traverses the ISP-1 Access Cloud and eventually reaches the web server owning the web address. The active web servers then participate in the TCP based probe sequence. The likelihood of the servers being active is very high because we did ensure the list included only the most recently used servers.

Note that the round trip time RTT is the time elapsed in milliseconds between steps 1 and 2 in the probe sequence PROBE above, that is, the time elapsed between sending a TCP SYN and receiving a TCP SYN ACK from the same address.

Figure 5D:
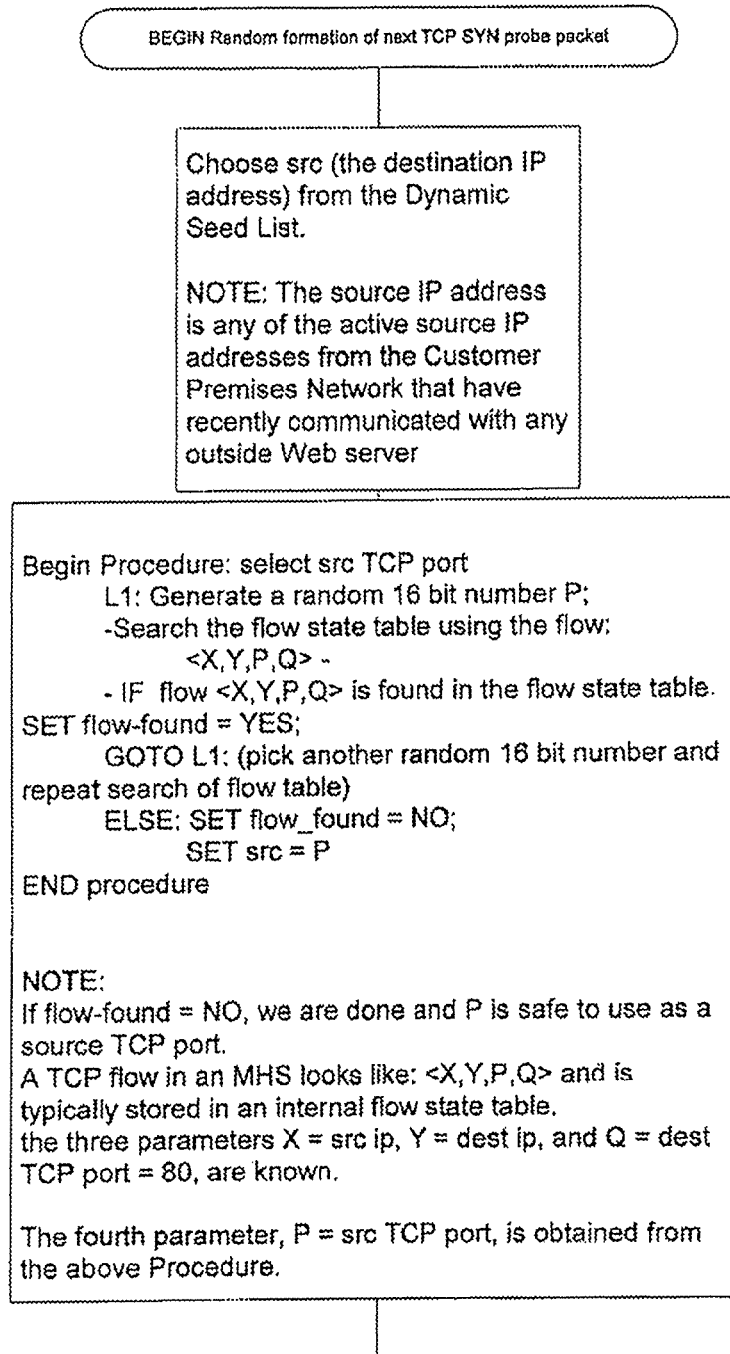
FIG. 5D is a flow chart of a Random TCP Source Port Selection program module used to verify ISP-ACSD UP or Down status in the ACSD of FIG. 4.

This results in the RTT table, where the entry in each ISP column shows the sampled round trip time in milliseconds:

FIG. 5D, illustrates a flow chart for a Randomized Source TCP Port Selection Program Module, referenced in FIG. 4 as one of the PRMP modules.

Each new set of probes must use a new random set of source TCP ports. It is unacceptable to use a fixed set of TCP port numbers as a source port number, as this results in failure to detect a (important) subset of important failures—that when an ISP router gets into a stuck condition because its state tables are full (It can handle old connections but it cannot add new connections into its cache).

FIG. 5D is a pseudo-code flow chart for a program module, Rnd_Tcp_Sel 540, one of the PRMP modules in the embodiment of the present invention shown in FIG. 4, that provides a random number used for each probe set PROBE. Procedure RND_TCP_SEL randomize TCP port addresses to ensure ISP-ACSD router caches will not go 'stale' and cause false UP status to be reported when new requests are not accepted and caches are full, as in the prior art.

The RND_TCP_SEL module makes use of TCP flows stored in a flow_state_table (not shown). The flow_state_table is typically located as one of the MHS ELEMENTS shown in FIG. 4. the generation, control and use of TCP flows and flow_state_tables is well understood in the art.

The steps of the RND_TCP_SEL module include:

```
542: Choose dest ip (the destination IP address) from the Dynamic
    Seed List, DFSL.
544: Next, the Procedure select src TCP port is called:
L1: Generate a random 16-bit number P and Search the flow state table
    using the flow: <X,Y,P,Q>
IF flow <X,Y,P,Q> is found in the flow state table, then
    SET flow-found = YES;
    GOTO L1: (pick another random 16 bit number and repeat search of
    flow table)
ELSE: SET flow-found = NO;
    SET src = P
    END procedure
``` the Procedure 540 generates a random 16-bit number P and searches the flow state table using the flow: <X,Y,P,Q>, if the flow <X,Y,P,Q> is found in the flow state table, then variable flow-found is set equal to YES and the Procedure brances back to label L1 where it picks another random 16 bit number and repeats a search of flow table.

If variable flow-found is equal to NO, the new RANDOM number P is safe to use as a source TCP port in the PROBE sequence.

A TCP flow is typically stored in an internal flow state table described elsewhere and located typically in one of the cooperating elements of MHS E-MHS, and looks like: <X,Y,P,Q>.

the three parameters X=src ip, Y=dest ip, and Q=dest TCP port=80, are known by the MHS and ACSD prior to the procedure call.

The fourth parameter, P=src TCP port, is obtained from the RND_TCP_SEL Procedure.

NOTE: The source IP address is any of the active source IP addresses from the Customer Premises Network that have recently communicated with any outside Web server FIG. 5E illustrates a flow chart 550 describing another of the PRMP modules of FIG. 4, the Update_Inbound_Packet_Byte_Count module.

Figure 5E:
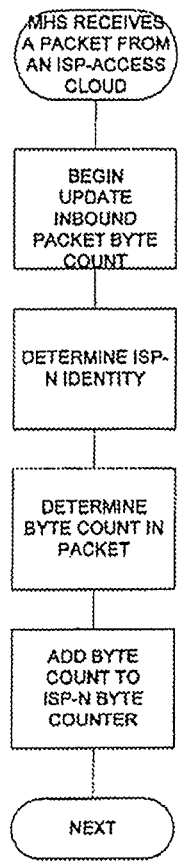
FIG. 5E depicts an Update Inbound Packet Byte Count program module used to verify ISP-ACSD UP or Down status in the ACSD of FIG. 4.

At step 526, module 550 receives a packet from the ISP-access cloud and begins the update inbound byte counter process at step 552. A following step 554 determines the identity of the ISP-n that transmitted the packet. Next, at step 526, the procedure 550 determines the byte count of the inbound packet and adds the packet byte count to the inbound byte counter related to the ISP-N at step 558.

with reference again to FIG. 4 and to FIG. 5E, The A-MHS continuously monitors Inbound_Byte_count for inbound packets from the ISP-Access Clouds and stores Inbound_Byte_count data in the Inbound_Byte_Counter located in the Dynamic Memory-1.

Alternatively, the Inbound_Byte_count may be stored in other registers or memory locations. For example they may be stored in Inbound_Byte_Counter memory locations or registers allocated within the Cooperating Elements Of Mhs indicated in FIG. 4.

In the method of the present invention, no packets leave the MHS wire-to that would otherwise contribute extra traffic to what might already be a busy network when all the ISP Access Clouds are reliably working, i.e., receiving and sending Internet traffic to/from the MHS. Only if there is suspect ISP, will the ACSD initiate extra traffic to reliably detect the UP/DOWN status for the suspect ISP-Access Cloud.

Instead, the Update_Inbound_Packet_Byte_Counters are maintained for each ISP. It is relatively frequent that these counters will already be part of typical MHS systems. In such cases, they can be used here as part of the COOPERATING ELEMENTS of FIG. 4.

If the Update_Inbound_Packet_Byte_Count counters do not exist in the MHS to which the ACSD device cooperates, then the counters will be alternatively be implemented in memory DM-1 as shown in FIG. 4 or as additional registers (not shown).

If there are 4 ISPs 0, 1, 2 and 3 then there will be 4 Inbound Byte counters maintained for example: IN(0), IN(1), IN(2), IN(3).

every Internet packet communicating between any ISP-Access Cloud and the CPN transits the A-MHS. Cooperating with the ACSD, the A-MHS examines the Byte length of each packet. For inbound packets, the A-MHS determines the Inbound_Byte_count length, from which ISP-n it is received, and calls the Update_Inbound_Packet_Byte_Count module. The Update_Inbound_Packet_Byte_Count then adds the Inbound_Byte_count to the corresponding ISP-n inbound_byte_counter and exits until the next inbound packet is received.

Figure 5F:
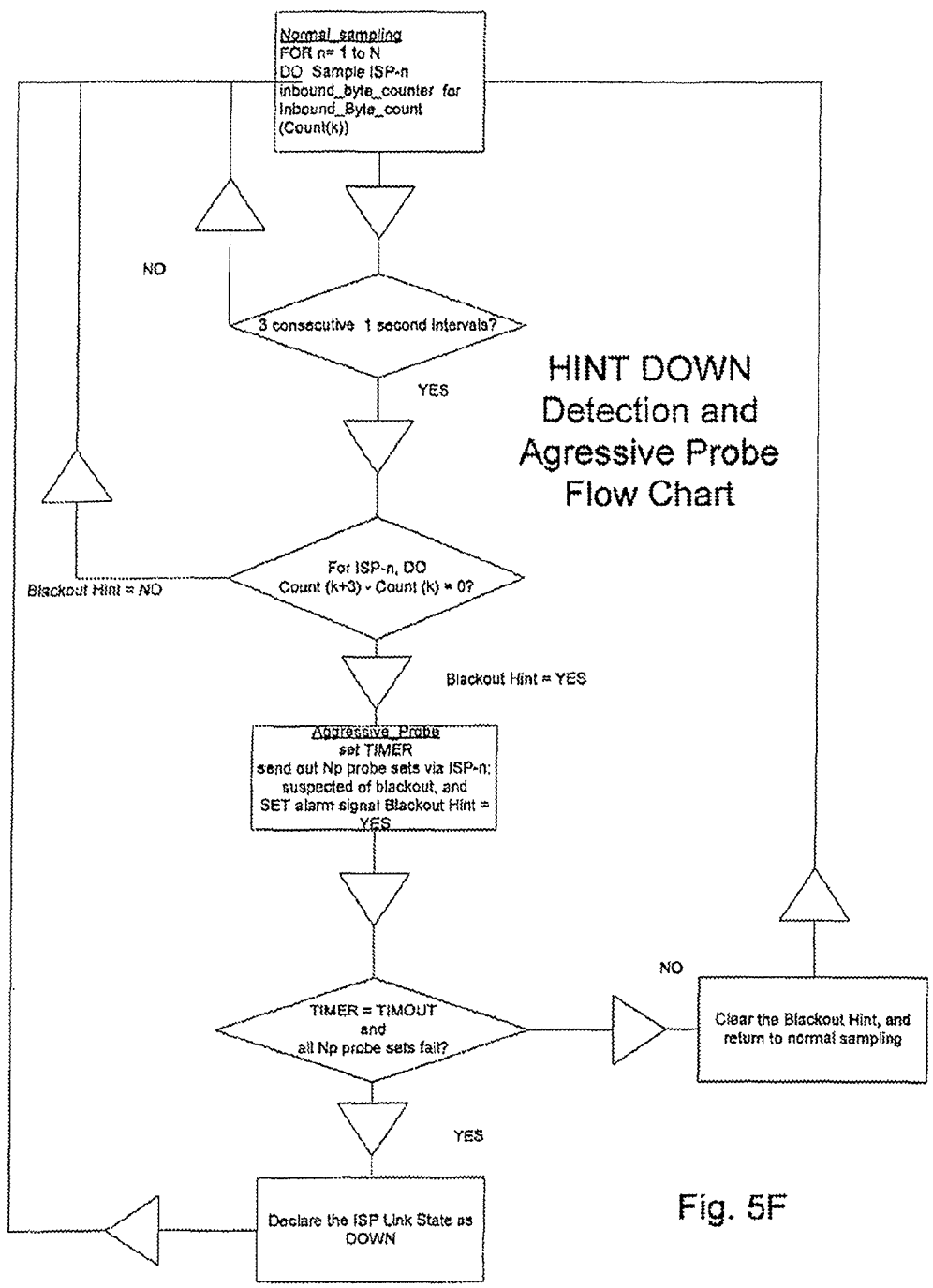
FIG. 5F illustrates a HINT_DOWN_DET and Aggressive Probe program module used to verify ISP-ACSD UP or Down status in the ACSD of FIG. 4.

FIG. 5F HINT_DOWN_DET module

The HINT_DOWN_DET module 560 is shown in FIG. 5F and relies on the Inbound_Byte_count data in the inbound_byte_counter to decide if an ISP-Access Clolud is suspect.

The ACSD Control_Program uses Update_Inbound_Packet_Byte_Count program module, and HINT_DOWN_DET module to cooperate continuously and reliably verify UP/DOWN status of each of the ISP-n Access Clouds with minimal invasive loading of Internet traffic.

The HINT_DOWN_DET procedure begins with a normal_sampling step for sampling the inbound_byte_counters when there is no hint of an unreliable ISP-n Access Cloud. The Normal_sampling step periodically examines each inbound_byte_counter for ach ISP-n.

Referring to FIG. 5F the separate HINT_DOWN_DET process in the A-MHS normally samples all inbound_byte_counters periodically, e.g., once per second at step 561, then branches to step 562, after sampling the byte count, at any time prior to some predetermined interval (e.g., an interval equal to or greater than a variable TIMEOUT), e.g., every 3 seconds, step 562 returns to the normal sampling step 561, after the TIMEOUT expires, step 562 branches to step 564 where the module HINT_DOWN_DET checks the inbound byte counters, for each ISP, to see if there is a difference in the byte count between the last two entries.

For example, letting k represent time in secs.:

Compute Inbound_Byte_count ($k$+3)−Inbound_Byte_count($k$)=Count_Difference.

If the Count_Difference is not zero at step 564, then there has been Internet traffic activity coming from the ISP-n. This is a good indication that the ISP-n Access Cloud in working and the status is UP; step 564 will branch to step 566, which sets Blackout_Hint=zero, and returns to normal sampling at step 561.

If the Count_Difference is zero, then this is a hint that the corresponding ISP Access Cloud might be in state DOWN.

At step 564 the HINT_DOWN_DET module sets variable Blackout_Hint to YES, and branches to step 568 where it starts a PROBE sequence to more reliably verify the suspect Access Cloud status.

```
BEGIN PROCEDURE:
  Step 561 Normal_sampling:
    for n= 1 to N;
    DO Sample ISP-n inbound_byte_counter for
    Inbound_Byte_count (Count(k));
    advance to Consecutive Interval Count Step;
  step 562: Consecutive In erval Count Step:
    3 consecutive 1 second intervals?
      if Yes goto Count COmpare step;
    If No return to Normal_sampling;
  step 564: Count Compare Step:
    For ISP-n, DO
    IF Count (k+3) − Count (k) = 0?
      THEN Blackout Hint = YES;
      go to AGGRESSIVE_PROBE step;
  step 566: ELSE return to Normal_Sampling;
  step 568: AGGRESSIVE_PROBE step:
    set TIMER
      send out Np probe sets via ISP-n suspected of blackout;
    SET alarm signal Blackout Hint = YES;
    advance to TIMER= TIMEOUT compare step;
  step 570: TIMER=TIMEOUT compare step:
    TIMER = TIMOUT?
    and
    all Np probe sets fail?
    if NO goto CLEAR HINT step 574;
    if YES goto DECLARE DOWN step 572;
  572: DECLARE DOWN step:
    Declare the ISP Link State as DOWN
    return to Normal_sampling step;
  574: CLEAR HINT step:
    Clear the Blackout Hint, and;
    return to normal sampling 561;
  END
```

At the end of the Byte_count_period, for each of the ISPs from 1 to N, the inbound_Byte_count at the end of the period is compared to the Inbound_Byte_count at the beginning of the period, if the difference is not zero, for all the ISPs, this is a good indication that they are all working and can be relied on. In that case, normal sampling is continued.

The Hint Down Detect method of the present invention does not introduce any traffic that is not already there as long as all ISP Access clouds are indicating regular traffic by continuously increasing Inbound_Byte_Counts. This is in contrast to prior art status detection methods that require extra Internet traffic to frequently and regularly probe each Access Cloud.

If the difference is zero for any one of the ISP-n Access Clouds, this is a hint that the ISP n may be down, since it is unlikely that there would be no activity for such a long period.

When the Inbound_Byte_count difference for an ISP-n is zero, the process branches to the Aggressive_Probe step. In the AGGRESSIVE_PROBE step, the ACSD causes the MHS to send out Np probe sets via the ISP-n suspected of blackout; starts a timer TIMER; and sets an alarm signal Blackout_Hint=YES.

At the next step, when the TIMER reaches a (predetermined) wait delay TIMEOUT, the ACSD checks the status of every single probe set of the Np probe sets. If every single probe set of that group of Np probes failed then the ACSD sets the ISP Link State status for that ISP as DOWN (e.g., Set ISP-n_Link_State=Down) and returns to the Normal_Sampling step.

The primary advantage of this process in the present invention is that it only adds extra traffic to the Internet traffic flow when there is a Hint Down detection. This makes the A-MHS system more efficient than prior art systems in terms of Internet traffic flow without sacrificing reliability.

If every single probe set of the Np group did not fail, the HINT_DOWN_DET process branches instead to the step where the ACSD clears Blackout_Hint and returns to Normal_Sampling.

Adaptive Seed List

FIG. 6 illustrates an example of an Adaptive Seed List 600 (Default or Dynamic) for an embodiment of the present invention such as the ISP-ACSD of FIG. 4.

This example of an Adaptive DFSL consists of 256 Internet ISP addresses 602. The DFSL could be larger or smaller than 256 depending on factors of initial and operational cost and convenience for the maker and end-user.

When the manufacturer first configures the ACSD system, the permanent memory PM-1 of FIG. 1 is loaded with an INITIAL DFSL before shipping to the end-user. The INITIAL DFSL would be populated with a collection of Internet ISP addresses that are well known and likely to be used by most end-users. For a given User operating environment, any of a large number of popular sites could be employed.

Adaptive Replacement of DEST IP Addresses

Figure 7A:
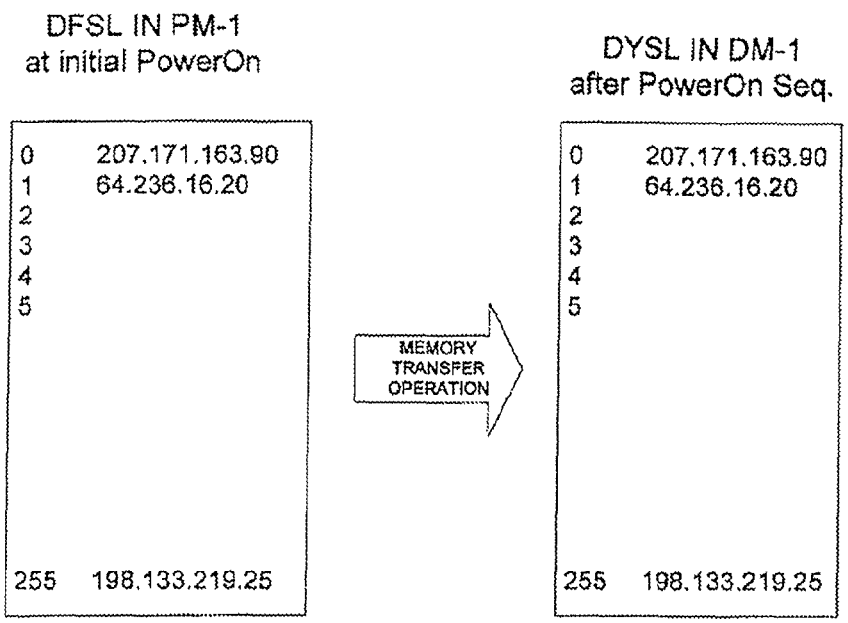
FIGS. 7A and 7B illustrate DFSL & Dynamic Seed List Adaptation program module used to verify ISP-ACSD UP or Down status in the ACSD of FIG. 4.
Figure 7B:
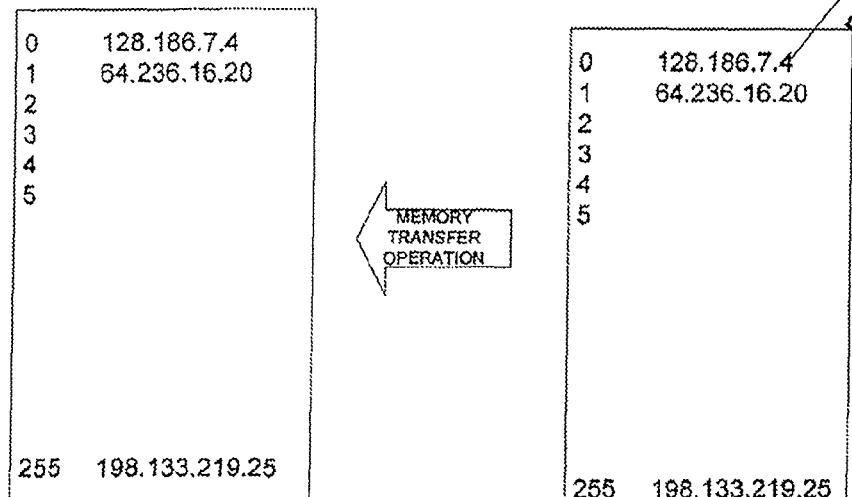

FIG. 7A And FIG. 7B illustrate the adaptive replacement of old dest ip address with new ones in the DFSL and the Dynamic Seed List for the ISP-ACSD of FIG. 4.

At initial power on, the initial default list (DFSL) is copied from Non-Volitile-Memory-1 into the Dynamic Seed List in Dynamic Memory-1.

When a new destination Web address (new dest ip address) is learned by the ACSD, it replaces one of the old dest ip addresses stored in the Dynamic Seed List in the Dynamic Memory-1.

If Adaptation_Complete_Flag is set to NO, the same old dest ip address in the DFSL in the Non-Volitile-Memory-1 is also updated with the new dest ip address.

If Adaptation_Complete_Flag is YES, the DFSL is not updated; otherwise it too is updated as shown here When 256 new entries have filled the Dynamic List and have been used to update the Default List, the 'Adaptation_Complete_Flag is set to YES.

When new destination IP addresses are observed, they are used to replace the 'old' addresses in the default "seed list" in permanent storage and in dynamic memory. Because most sites access web servers frequently, over time the default seed list becomes replaced with a new seed list that is adapted to a specific customer site. As soon as 256 specific new IP addresses are learnt in this way, the seed list becomes fixed again, and stored in permanent storage.

FIGS. 8*a* & 8*b* show the conventional IP & TCP Header format and are repeated here for convenient reference.

TABLE 4

RTT History Time Table

| Destination ISP Address | ISP 1 | ISP2 | ISP 3 | ISP 4 | ISP (m) |
|---|---|---|---|---|---|
| 65.12.3.4 | 25 | 35 | 28 | 41 | . . . |
| 129.1.3.8 | 112 | 134 | 45 | 98 | . . . |
| 67.123.54.2 | 32 | 28 | 31 | 43 | . . . |

TABLE 4-continued

RTT History Time Table

| Destination ISP Address | ISP 1 | ISP2 | ISP 3 | ISP 4 | ISP (m) |
|---|---|---|---|---|---|
| 68.34.12.55 | 45 | 51 | 67 | 29 | . . . |
| 67.33.124.23 | 55 | 34 | 28 | 112 | . . . |

The length of the RTT table is implementation dependent and not germane to the description of the present invention. It could be up to 4,000 entries or even more, if desired.

Round Trip Time History; table & update.

The means for implementation of the RTT table in the ACSD invention is well known in the art and needs no further explanation other than that already given here.

For the Dynamic Memory List, and for Each Destination IP Address, the Probe Sequence PROBE is Sent and the Round Trip Time RTT Sampled (in Milliseconds) by Measuring the Time Elapsed Between TCP SYN Sent and TCP SYN ACK Received.

ISP Access Cloud Down Hint Detection

A common way to detect link down is to constantly send out probe traffic. This is to be avoided as the user is paying for useful bandwidth that should not be over-used by a link-down detection technique.

Instead, a hint that the link may be down is detected in the following method. The system implements counters of bytes seen, to and from each ISP router. If there are 2 ISP routers, 1 and 2, let In-1 and In-2 be the inbound byte counts, and let O-1 and O-2 be the outbound byte counts. Sample these values every 1 second. If in 3 consecutive 1-second intervals, these counters do not increment, this suggests inactivity, and inactivity might be a result of a link failure. Declare a Blackout Hint state (set Blackout Hint State=1) for the ISP identifier.

Aggressive Probe Method

Upon detection of a Blackout Hint (Blackout Hint State=1), the system transitions to Aggressive Probes (e.g., Aggressive Probe sub-routine?) of the ISP (Access Port) in question, lets say its identifier is ISPX. (Then send) Up to N (max of N=256) probes (Probe Sequence set, let acronym=PSS) to different destination IP addresses. N is set by default to 10. For IP Address I, I=1 to MN, find the max RTT (e.g., max RTT, 1=1 to M, is RTT (x) MAX) for ISPX in this set 1 to MN. Set Timeout=3×max RTT.

As an example, in Table 1, if JSPX was actually ISP 1, the max RTT is 112 and the Timeout is (set to) 336 milliseconds.

Send out all N=10 probes, one after another. As a general rule—the spacing between these needs to be reasonably short and all N of them should complete in at most 2 seconds.

Now, start the timer and wait for the Timeout seconds to expire. Check (for) the matching (SYN ACK) responses (SYN packets are sent, SYN ACK packets are expected in response from the target).

If, and only if, out of N probes, zero SYN ACK responses were received, then we can declare ISPX Link State is DOWN (SET ISPX Link State=DOWN).

Mathematical Proof of Reliability

The following is a mathematical proof showing improved reliability for embodiments of the present A-MHS invention.

We use Chebychev's Inequality $$P(X-\text{mean} > k*\text{STD DEV}) < 1/(\text{square of } k)$$

Here, X is the actual time that it takes for the probe sequence to elicit a response from the probed address.

Since there are (at least) 10 probes, there will be an equal number of (at least) 10 random variables X(1), . . . , X(10).

The probability of a false detection of ISP Access Cloud failure is the probability that all the probe samples returned unusually late, i.e. all of them return only after 3 times Worst Case RTT has elapsed.

Note that for each of the 10 probe destinations, the RTT sample size is just 1. Therefore sample value=Mean.

For the standard deviation, since we have no other information, we have to estimate it as a reasonable positive number, in order to make use of Chebyshev's inequality correctly.

Hence let us estimate the Std Deviation=Sample Value. It has been found from a sampling of observations of these RTT values that they tend to have a standard deviation that is much smaller than any individual sample value, so this estimate is therefore a conservative one.

Hence, for each X (i), let u (i) be the corresponding mean and standard deviation.

Let Worst Case RTT=u.

From $$P(X-u > k*u) < 1/(\text{square of } k)$$

We derive $$P(X > (k+1)*u) < 1/(\text{square of } k)$$

Also, since each u (i)<u, we obtain $$P(X(i) > (k+1)*u(i)) < P(X(i) > (k+1)*u) < 1/(\text{square of } k)$$

Since we set our timeout for all 10 probes to be 3 times Worst Case RTT, the (k+1) factor=3, and hence k=2.

The probability that a single probe timed out falsely (i.e. the probe actually returned after 3 times worst case RTT) is less than ¼.

Therefore, the probability that all 10 probes timed out falsely is less than (¼)**10 (i.e. ¼ to the power of 10), is about 0.00000095.

Therefore, the reliability of the method is greater than (1−0.00000095)=0.999999

Note that although preferred embodiments of the present invention can be described as including a single computing processor system and specific program modules for enabling the various features and benefits of the present invention, the invention is understood to apply to Adaptive MHS systems and adaptive ACSD units that include either single or multi-processor computing modules. It is also understood that the functions and features of the various Program Modules of the present invention can also be implemented in hard-wired circuitry, e.g., Large-Scale FPGA's, ASIC's and the like.

What is claimed is:

1. A computer implemented method, comprising:
   collecting a first timestamp value from an outbound packet, the outbound packet directed to a destination network address through a first internet service provider access cloud;
   collecting a second timestamp value from an inbound packet, the inbound packet corresponding to a receipt acknowledgement of the outbound packet;
   subtracting the first timestamp value from the second timestamp value to obtain a round trip time associated with the destination network address and the internet service provider access cloud;
   including the round trip time in a list of a plurality of round trip times in a history time table;

executing a probe sequence through the first internet service provider access cloud when a down hint value for a link failure of the first internet service provider access cloud is in a high state; and determining the link failure when the probe sequence is not validated according to a timing selected from the history time table.

2. The method of claim 1, further comprising forming the history time table having a plurality of rows, each row including a destination network address and a plurality of most recently observed round trip time values for the destination network address, and wherein each of the most recently observed round trip time values is associated with a specific internet service provider access cloud.

3. The method of claim 1, further comprising dynamically updating the history time table with new destination network addresses detected through a network traffic.

4. The method of claim 1, further comprising selecting inbound packets and outbound packets from a network server to determine the round trip times in the history time table associated with the network server.

5. The method of claim 1, further comprising configuring a plurality of internet service provider access clouds including the first internet service provider access cloud for coupling a client server with a network.

6. The method of claim 1, further comprising increasing the history time table by collecting a second round trip time from a new destination network address.

7. The method of claim 1, further comprising reducing a probability of a false failure detect by increasing the number of destination network addresses in the history time table.

8. The method of claim 1, further comprising determining a down hint value by counting a number of inbound bytes in the inbound packet and a number of outbound bytes in the outbound packet over a period of time; and setting the down hint value to a high state when a selected number of consecutive inbound byte counts and outbound byte counts remains unchanged.

9. The method of claim 1, wherein the probe sequence comprises a plurality of probe packets directed through the internet service provider access cloud, and wherein determining the link failure comprises setting the selected timing from a high roundtrip time value selected from the history time table.

10. The method of claim 1, further comprising increasing the number of probe packets in the probe sequence to reduce the probability of a false failure detection.

11. A system, comprising:
a) a processor;
b) an input/output (I/O) chip set;
c) a memory;
d) a multi homing system (MHS); and
e) a bus, wherein the bus connects the processor, the input/output chip set, the memory device, and the multi homing system; and the processor executes instructions to:
collect a first timestamp value from an outbound packet, the outbound packet directed to a destination network address through a first internet service provider access cloud;
collect a second timestamp value from an inbound packet, the inbound packet corresponding to a receipt acknowledgement of the outbound packet;
subtract the first timestamp value from the second timestamp value to obtain a round trip time associated with the destination network address and the internet service provider access cloud;

include the round trip time in a list of a plurality of round trip times in a history time table;

execute a probe sequence through the first internet service provider access cloud when a down hint value for a link failure of the first internet service provider access cloud is in a high state; and determine the link failure when the probe sequence is not validated according to a timing selected from the history time table.

12. The system of claim 11, wherein the memory is configured to store the history time table comprising a plurality of rows, each row including a destination network address and a plurality of most recently observed round trip time values for the destination network address, and wherein each of the most recently observed round trip time values is associated with a specific internet service provider access cloud.

13. The system of claim 11, wherein the memory comprises a permanent storage and a dynamic storage, further wherein:
the dynamic storage comprises a dynamic seed list of destination network addresses that is adapted to a specific customer site, and
the permanent storage comprises a default seed list of destination network addresses that is maintained upon system power off.

14. The system of claim 13, wherein the default seed list of destination network addresses comprises a list of popular sites associated with a user operating environment.

15. The system of claim 13, wherein the dynamic seed list is configured to store a new destination address learned by the system while in operation.

16. The system of claim 13, wherein an old address in the dynamic seed list is replaced by a new network address learned by the system.

17. The system of claim 16 wherein the default seed list is replaced by the dynamic seed list in the permanent storage once the dynamic seed list reaches a predetermined number of new network addresses.

18. A non-transitory, computer readable medium having stored thereon a plurality of instructions, said plurality of instructions when executed by a computer, cause said computer to perform:
collecting a first timestamp value from an outbound packet, the outbound packet directed to a destination network address through a first internet service provider access cloud;
collecting a second timestamp value from an inbound packet, the inbound packet corresponding to a receipt acknowledgement of the outbound packet;
subtracting the first timestamp value from the second timestamp value to obtain a round trip time associated with the destination network address and the internet service provider access cloud;
including the round trip time in a list of a plurality of round trip times in a history time table;
executing a probe sequence through the first internet service provider access cloud when a down hint value for a link failure of the first internet service provider access cloud is in a high state; and
determining the link failure when the probe sequence is not validated according to a timing selected from the history time table.

19. The non-transitory, computer readable medium of claim 18, wherein the instructions further cause the computer to perform:

determining a down hint value by counting a number of inbound bytes in the inbound packet and a number of outbound bytes in the outbound packet over a period of time; and setting the down hint value to a high state when a selected number of consecutive byte counts remains unchanged.

20. The non-transitory, computer readable medium of claim 18, wherein the probe sequence comprises a plurality of probe packets directed through the internet service provider access cloud, and the instructions that cause the computer to perform determining the link failure comprise instructions that cause the computer to perform setting the selected timing from a high round trip time value selected from the history time table.

\* \* \* \* \*